(12) United States Patent
Sauer et al.

(10) Patent No.: US 8,334,330 B2
(45) Date of Patent: Dec. 18, 2012

(54) REDUCTION OF VOLATILES OF STABILIZED POLYPROPYLENE/TALC COMPOSITIONS BY USING SPECIFIC ACIDIC ENVIRONMENT

(75) Inventors: Christian Sauer, Linz (AT); Jens Reussner, Kammerschlag (AT); Wolfgang Stockreiter, Puchenau (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 12/737,255

(22) PCT Filed: Jun. 24, 2009

(86) PCT No.: PCT/EP2009/057932
§ 371 (c)(1),
(2), (4) Date: Dec. 22, 2010

(87) PCT Pub. No.: WO2010/000660
PCT Pub. Date: Jan. 7, 2010

(65) Prior Publication Data
US 2011/0118396 A1    May 19, 2011

(30) Foreign Application Priority Data

Jul. 1, 2008 (EP) .................................. 08159394

(51) Int. Cl.
*C08K 5/00* (2006.01)
*C08K 5/20* (2006.01)
(52) U.S. Cl. ........................................ 524/210; 524/232
(58) Field of Classification Search .................. 524/210
See application file for complete search history.

(56) References Cited

U.S. PATENT DOCUMENTS

| | | | | |
|---|---|---|---|---|
| 3,028,363 A | * | 4/1962 | Robbins et al. | 524/240 |
| 3,553,158 A | | 1/1971 | Gilfillan | |
| 3,812,073 A | * | 5/1974 | Ito et al. | 523/511 |
| 4,436,863 A | * | 3/1984 | Albee et al. | 524/451 |
| 5,100,930 A | * | 3/1992 | Fukui et al. | 523/100 |
| 2007/0197712 A1 | | 8/2007 | Fujiwara | |

FOREIGN PATENT DOCUMENTS

| | | |
|---|---|---|
| EP | 0 407 198 | 1/1991 |
| EP | 0 661 341 | 7/1995 |
| WO | WO 98/59002 | 12/1998 |

* cited by examiner

*Primary Examiner* — Hui Chin
(74) *Attorney, Agent, or Firm* — Warn Partners, P.C.

(57) ABSTRACT

The present invention is directed to the use of carbonyl compounds to reduce the headspace emission according to VDA 277 of a polymer, wherein the carbonyl compounds are selected from the group consisting of aromatic carboxylic acid having a pKa measured in DMSO of at least 10.5, fatty acid amide and fatty acid ester.

27 Claims, No Drawings

REDUCTION OF VOLATILES OF STABILIZED POLYPROPYLENE/TALC COMPOSITIONS BY USING SPECIFIC ACIDIC ENVIRONMENT

This application is a National Stage of International Application No. PCT/EP2009/057932, filed Jun. 24, 2009. This application claims priority to European Patent Application No. 08159394.9 filed on Jul. 1, 2008. The disclosures of the above applications are incorporated herein by reference.

The present invention relates a new polypropylene composition comprising organic antioxidants and the use of specific carbonyl compounds in such a composition.

Polypropylene is the material of choice for many applications. For instance polypropylene in combination with talc is used as back sheets of blister packaging as well as in articles in the automotive interior. Said polypropylene/talc compositions are—generally speaking—good processable and can be individually customized. However such materials must also provide long term stability against environmental impacts, like oxidative degradation, keeping the tailored properties of the polypropylene/talc composition on the desired level. Accordingly antioxidants are added to impair the degradation of the polypropylene/talc compositions. However the antioxidants themselves may be instable under specific environmental stresses, which might lead also to malodour. Over the last years the standard requirements for long term stability have been even steadily tightened, which in turn increased the amounts of additives to satisfy the ambitioned desires, like heat resistance and/or mechanical properties. On the other hand such an increasing amount of additives intensifies the risk of side reactions. Such side reactions, in particular in cases where degradation of antioxidants is involved, lead to side products being quite often volatile. Of course volatile compounds should be kept on low levels in particular as they are not accepted by the customers.

Thus the object of the present invention is to reduce the amount of volatile compounds, in particular of volatile compounds in polypropylene compositions comprising talc and organic antioxidants. There is in particular the desire to reduce the amount of headspace emission according to VDA 277.

The first finding of the present invention is that the amount of volatile compounds is mainly based on the rather rapid degradation of the organic antioxidants. The second finding of the present invention is that the degradation of the antioxidants can be suppressed by carboxylic acids and their derivatives having C5 to C30 carbon atoms, preferably by carboxylic acids and their derivatives having C5 to C30 carbon atoms with a rather low acidity, i.e. having a pKa of at least 10 measured in DMSO.

Accordingly the present invention is directed to the use of carbonyl compounds (D) to reduce the headspace emission according to VDA 277, preferably the headspace emission of 2-methyl-propene according to VDA 277, of a polymer, e.g. a polymer composition, wherein the carbonyl compounds (D) are selected from the group consisting of aromatic carboxylic acid ($D^1$) having a pKa measured in DMSO of at least 10.5, fatty acid amide ($D^2$) and fatty acid ester ($D^3$).

More precisely the present invention is directed to the use of the above mentioned carbonyl compounds (D) to reduce the headspace emission according to VDA 277, preferably the headspace emission of 2-methyl-propene according to VDA 277, of a polymer composition wherein said composition comprises in addition to the carbonyl compounds (D) a polypropylene (A), talc (B), organic antioxidants (C), and optionally phosphorous antioxidants (E). More information about the individual components of said composition in which the carbonyl compounds (D) reduce the head space emission is given in detail below.

The present invention is also directed to a polymer composition comprising
  (a) polypropylene (A)
  (b) talc (B)
  (c) organic antioxidants (C),
  (d) carbonyl compounds (D) selected from the group consisting of carboxylic acid ($D^1$), carboxylic acid amide ($D^2$) and carboxylic acid ester ($D^3$) with the proviso that the carbonyl compounds (D) have a pKa measured in DMSO of at least 10.5, and
  (e) optionally phosphorous antioxidants (E).

Preferably the carboxylic acid ($D^1$) is an aromatic carboxylic acid and/or the carboxylic acid amide ($D^2$) is a fatty acid amide ($D^2$) and/or the carboxylic acid ester ($D^3$) is a fatty acid ester ($D^3$).

Alternatively the new polymer composition can be defined as a polymer composition comprising
  (a) polypropylene (A)
  (b) talc (B)
  (c) organic antioxidants (C),
  (d) carbonyl compounds (D) selected from the group consisting of aromatic carboxylic acid ($D^1$) having a pKa measured in DMSO of at least 10.5, fatty acid amide ($D^2$) and fatty acid ester ($D^3$), and
  (e) optionally phosphorous antioxidants (E).

Even more preferably the invention is directed to a polymer composition comprising polypropylene (A) and additionally
  (a) 1,000 to 550,000 ppm of talc (B),
  (b) 100 to 5,000 ppm of phenolic antioxidants (C),
  (c) 100 to 8,000 ppm carbonyl compounds (D) selected from the group consisting of carboxylic acid ($D^1$), preferably aromatic carboxylic acid ($D^1$), carboxylic acid amide ($D^2$), preferably fatty acid amide ($D^2$), and carboxylic acid ester ($D^3$), preferably fatty acid ester ($D^3$), optionally with the proviso that carbonyl compounds (D) have a pKa measured in DMSO of at least 10.5, and
  (d) optionally 100 to 5,000 ppm of phosphorous antioxidants (E),
  based on the total composition.

As usual 1 ppm of additive corresponds to 1 mg additive in 1 kg composition.

Preferably the inventive polymer composition does not comprise hindered amine light stabilizers (F).

Surprisingly it has been found out that the above defined composition show significant reduction in headspace emission, in particular show significant reduction of 2-methyl-1-propene, compared with polypropylene compositions comprising talc and organic antioxidants but no carbonyl compounds (D) as defined herein, in particular no aromatic carboxylic acid ($D^1$) having a pKa measured in DMSO of at least 10.5 and/or no fatty acid amide ($D^2$) and/or no fatty acid ester ($D^3$) (see table 1). Such a reduced headspace emission is accomplished with the carbonyl compounds (D) but not with other possible candidates, like anthracene.

In the following the present invention is described in more detail.

The polypropylene (A) used in the inventive polypropylene composition can be any polypropylene, in particular polypropylenes suitable for the automotive interior and/or for back sheets of blister packaging. Accordingly a preferred polypropylene (A) comprises (is) a heterophasic propylene copolymer (A'). Heterophasic polypropylene systems are well known in the art and are systems in particular obtained in an at least two step process resulting in a multiphase structure comprising a polypropylene matrix (A$^1$), preferably an isotactic polypropylene matrix (A$^1$), and inclusions dispersed therein comprising amorphous elastomer (A$^2$). Such systems can be easily tailored for the requirements needed by setting the comonomer content in the polypropylene matrix (A$^1$) and in the amorphous elastomer (A$^2$) respectively. Such a heterophasic propylene copolymer (A') may have an MFR$_2$ in the range of 2.0 to 80.0 g/10 min, more preferably in the range of 5.0 to 50.0 g/10 min, still more preferably in the range of 7.0 to 20.0 g/10 min. Typically such a heterophasic propylene copolymer (A') has an amorphous elastomer (A$^2$) being a propylene-ethylene rubber (EPR) (A$^2$). The polypropylene matrix (A$^1$) can be either a propylene homopolymer or a propylene copolymer, wherein the latter is especially preferred. The total comonomer, preferably ethylene, content is in the range of 2 to 25 wt.-% based on the total heterophasic propylene copolymer (A'). The amount of xylene solubles may be in the range of 10 to 40 wt.-%, preferably 15 to 30 wt.-%.

Of course the polypropylene (A) may additionally comprise beside the heterophasic propylene copolymer (A') a high density polyethylene (HDPE) having for instance a density in the range of 0.954 to 0.966 g/cm3 and a melt flow rate (MFR$_2$ at 190° C.) of 0.1 to 15.0 g/10 min. Further the polypropylene (A) may also comprise additionally EPR, propylene-ethylene copolymers and/or ethylene-octene copolymers.

It is however preferred that the polypropylene (A) is the only polymer component in the inventive polymer composition.

Preferably the polypropylene (A) is present in the inventive composition in the amount of at least 50.0 wt.-%, more preferably at least 60.0 wt.-%, yet more preferably at least 70.0 wt.-%, still more preferably of at least 75.0 wt.-%.

Beside the polypropylene the invention is in particular defined by its additives.

Accordingly to be useful in the above mentioned applications the inventive polymer composition must comprise talc (B). Talc (B) is usually used to support the crystallization behaviour of the polymer material. It can be also employed as a shrinkage reducing additive and/or reinforcing agent. In any case talc (B) has been recognized in the above mentioned applications as an indispensable part of polypropylene compositions. Talc (B) is a mineral composed of hydrated magnesium silicate and may comprise low amounts of residues, like iron oxide (FeO) and/or iron silicate. Generally the amounts of residues do not exceed 5.0 wt.-%. Thus it is preferred that the talc (B) comprise 0.1 to 3.5 wt.-%, more preferably 0.1 to 3.0 wt.-%, residues, i.e. residues comprising iron, like iron oxide or iron silicate. Of course talc (B) may also be a chlorite-talc as the commercial product "Steamic T1 C A" of Luzenac.

Preferably the talc (B) according to this invention has a particle size (d50%) of below 3.0 μm (d50% indicates that 50 wt-% of the talc has a particle size below 3.0 μm) and/or a particle size (d98%) of below 15.0 μm (d98% indicates that 98 wt-% of the talc has a particle size below 15.0 μm), more preferably a particle size (d50%) of below 2.0 μm and/or a particle size (d98%) of below 10.0 μm, yet more preferably a particle size (d50%) of below 1.0 μm and/or a particle size (d98%) of below 5.0 μm.

As further additives organic antioxidants (C) are required. Antioxidants are needed to impair oxidative degradation of the polypropylene. However the antioxidants themselves may be instable in case they come in contact with other additives. In the present case it has been observed that the organic antioxidants are rather quickly degraded in a polypropylene composition comprising talc. The degradation of the organic oxidants can be very easily deducted in the headspace emission according to VDA 277. The emission spectrum shows degradation products (for instance 2-methyl-1-propene) originating from the organic antioxidants. Such degradation products are undesired. Without to be bond on the theory, the degradation of the organic antioxidants may be catalyzed due to the presence of the talc and/or its residues dispersed therein. On the other hand one can neither abstain from talc nor from organic antioxidants in the desired applications, since this would deteriorate the other properties of the polymer composition needed in the technical fields as defined in the instant invention. Thus as stated above organic antioxidants (C) must be present in the inventive polymer composition.

Preferred organic antioxidants (C) are phenolic antioxidants (C').

The term "phenolic antioxidant" (C') as used in the instant invention stands for any compound capable of slowing or preventing the oxidation of the polymer component, i.e. the polypropylene. Additionally such a phenolic antioxidant (C') must of course comprise a phenolic residue.

Better results can be achieved in case the phenolic antioxidants (C') are sterically hindered. The term "Sterically hindered" according to this invention means that the hydroxyl group (HO—) of the phenolic antioxidants (C') is surrounded by sterical alkyl residues.

Accordingly the phenolic antioxidants (C') preferably comprise the residue of formula (I)

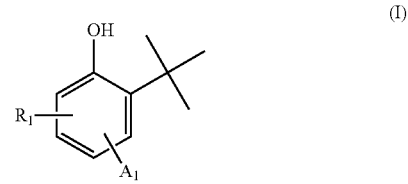

(I)

wherein
R$_1$ being located at the ortho- or meta-position to the hydroxyl-group and R$_1$ is (CH$_3$)$_3$C—, CH$_3$— or H, preferably (CH$_3$)$_3$C—, and
A$_1$ constitutes the remaining part of the phenolic antioxidant (C') and is preferably located at the para-position to the hydroxyl-group.

Preferably the phenolic antioxidants (C') preferably comprise the residue of formula (Ia)

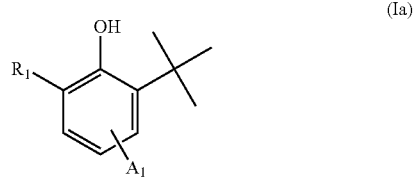

(Ia)

wherein
R$_1$ is (CH$_3$)$_3$C—, CH$_3$— or H, preferably (CH$_3$)$_3$C—, and
A$_1$ constitutes the remaining part of the phenolic antioxidant (C').

Preferably A$_1$ is in para-position to the hydroxyl-group.

Additionally the phenolic antioxidants (C') shall preferably exceed a specific molecular weight. Accordingly the phenolic antioxidants (C') have preferably a molecular weight of more than 785 g/mol, more preferably more than 1100 g/mol. On the other hand the molecular weight should be not too high, i.e. not higher than 1300 g/mol. A preferred range is from 785 to 1300 g/mol, more preferably from 1000 to 1300 g/mol, yet more preferably from 1100 to 1300 g/mol.

Further the phenolic antioxidants (C') can be additionally defined by the amount of phenolic residues, in particular by the amount of phenolic residues of formula (I) or (Ia). Accordingly the phenolic antioxidants (C') may comprise(s) 1, 2, 3, 4 or more phenolic residues, preferably 1, 2, 3, 4 or more phenolic residues of formula (I) or (Ia).

Moreover the phenolic antioxidants (C') comprise mainly only carbon atoms, hydrogen atoms and minor amounts of O-atoms, mainly caused due to the hydroxyl group (HO—) of the phenolic residues. However the phenolic antioxidants (C') may comprise additionally minor amounts of N, S and P atoms. Preferably the phenolic antioxidants (C') are constituted by C, H, O, N and S atoms only, more preferably the phenolic antioxidants (C') are constituted by C, H and O only.

As stated above the phenolic antioxidants (C') shall have a rather high molecular weight. A high molecular weight is an indicator for several phenolic residues. Thus it is in particular appreciated that the phenolic antioxidants (C') have 4 or more, especially 4, phenolic residues, like the phenolic residue of formula (I) or (Ia).

As especially suitable phenolic antioxidants (C') have been recognized compounds comprising at least one residue of formula (II)

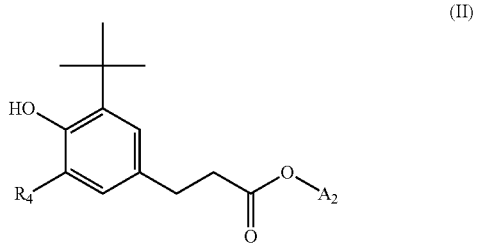

(II)

wherein
R$_4$ is (CH$_3$)$_3$C—, CH$_3$—, or H, preferably (CH$_3$)$_3$C—, and
A$_2$ constitutes the remaining part of the phenolic antioxidant (C').

Considering the above requirements the phenolic antioxidants (C') are preferably selected from the group consisting of
2,6-di-tert-butyl-4-methylphenol (CAS no. 128-37-0; M 220 g/mol),
pentaerythrityl-tetrakis(3-(3,5-di-tert-butyl-4-hydroxyphenyl) propionate (CAS no. 6683-19-8; M 1178 g/mol),
octadecyl 3-(3',5'-di-tert-butyl-4-hydroxyphenyl)propionate (CAS no. 2082-79-3; M 531 g/mol)
1,3,5-trimethyl-2,4,6-tris-(3,5-di-tert-butyl-4-hydroxybenzyl) benzene (CAS no. 1709-70-2; M 775 g/mol),
2,2'-thiodiethylenebis(3,5-di-tert.-butyl-4-hydroxyphenyl) propionate (CAS no. 41484-35-9; M 643 g/mol),
calcium bis(ethyl 3,5-di-tert-butyl-4-hydroxybenzylphosphonate) (CAS no. 65140-91-2; M 695 g/mol),
1,3,5-tris(3',5'-di-tert.butyl-4'-hydroxybenzyl)-isocyanurate (CAS no. 27676-62-6, M 784 g/mol),
1,3,5-tris(4-tert.butyl-3-hydroxy-2,6-dimethylbenzyl)-1,3,5-triazine-2,4,6-(1H,3H,5H)-trione (CAS no. 40601-76-1, M 813 g/mol),
bis(3,3-bis(3'-tert-butyl-4'-hydroxyphenyl)butanic acid) glycolester (CAS no. 32509-66-3; M 794 g/mol),
4,4'-thiobis(2-tert-butyl-5-methylphenol) (CAS no. 96-69-5; M 358 g/mol),
2,2'-methylene-bis-(6-(1-methyl-cyclohexyl)-para-cresol) (CAS no. 77-62-3; M 637 g/mol),
3,3'-bis(3,5-di-tert-butyl-4-hydroxyphenyl)-N,N'-hexamethylenedipropionamide (CAS no. 23128-74-7; M 637 g/mol),
2,5,7,8-tetramethyl-2-(4',8',12'-trimethyltridecyl)-chroman-6-ol (CAS no. 10191-41-0; M 431 g/mol),
2,2-ethylidenebis(4,6-di-tert-butylphenol) (CAS no. 35958-30-6; M 439 g/mol),
1,1,3-tris(2-methyl-4-hydroxy-5'-tert-butylphenyl) butane (CAS no. 1843-03-4; M 545 g/mol),
3,9-bis(1,1-dimethyl-2-(beta-(3-tert-butyl-4-hydroxy-5-methylphenyl)propionyloxy)ethyl)-2,4,8,10-tetraoxaspiro [5.5]undecane (CAS no. 90498-90-1; M 741 g/mol),
1,6-hexanediyl-bis(3,5-bis(1,1-dimethylethyl)-4-hydroxybenzene)propanoate) (CAS no. 35074-77-2; M 639 g/mol),
2,6-di-tert-butyl-4-nonylphenol (CAS no. 4306-88-1; M 280 g/mol),
4,4'-butylidenebis(6-tert-butyl-3-methylphenol (CAS no. 85-60-9; M 383 g/mol);
2,2'-methylene bis(6-tert-butyl-4-methylphenol) (CAS no. 119-47-1; M 341 g/mol),
triethylenglycol-bis-(3-tert-butyl-4-hydroxy-5-methylphenyl) propionate (CAS no. 36443-68-2; M 587 g/mol),
a mixture of C13 to C15 linear and branched alkyl esters of 3-(3',5'-di-t-butyl-4'-hydroxyphenyl) propionic acid (CAS no. 171090-93-0; M$_w$ 485 g/mol),
6,6'-di-tert-butyl-2,2'-thiodip-cresol (CAS no. 90-66-4; M 359 g/mol),
diethyl-(3,5-di-tert-butyl-4-hydroxybenzyl) phosphate (CAS no. 976-56-7; M 356 g/mol),
4,6-bis(octylthiomethyl)-o-cresol (CAS no. 110553-27-0; M 425 g/mol),
benzenepropanoic acid, 3,5-bis(1,1-dimethyl-ethyl)-4-hydroxy-C7-C9-branched and linear alkyl esters (CAS no. 125643-61-0; M$_w$ 399 g/mol),
1,1,3-tris[2-methyl-4-[3-(3,5-di-tert-butyl-4-hydroxyphenyl)propionyloxy]-5-tert-butylphenyl]butane (CAS no. 180002-86-2; M 1326 g/mol),
mixed styrenated phenols (M ca 320 g/mol; CAS no. 61788-44-1; M ca. 320 g/mol),
butylated, octylated phenols (M ca 340 g/mol; CAS no. 68610-06-0; M ca 340 g/mol), and
butylated reaction product of p-cresol and dicyclopentadiene (M$_w$ 700 to 800 g/mol; CAS no. 68610-51-5; M$_w$ 700-800 g/mol).

More preferably the phenolic antioxidants (C') are selected from the group consisting of
pentaerythrityl-tetrakis(3-(3,5-di-tert-butyl-4-hydroxyphenyl) propionate (CAS no. 6683-19-8; M 1178 g/mol),
octadecyl 3-(3',5'-di-tert-butyl-4-hydroxyphenyl)propionate (CAS no. 2082-79-3; M 531 g/mol)
bis(3,3-bis(3'-tert-butyl-4'-hydroxyphenyl)butanic acid) glycolester (CAS no. 32509-66-3; M 794 g/mol),
3,3'-bis(3,5-di-tert-butyl-4-hydroxyphenyl)-N,N'-hexamethylenedipropionamide (CAS no. 23128-74-7; M 637 g/mol), 3,9-bis(1,1-dimethyl-2-(beta-(3-tert-butyl-4-hydroxy-5-methylphenyl)propionyloxy)ethyl)-2,4,8,10-tetraoxaspiro[5.5]undecane (CAS no. 90498-90-1; M 741 g/mol),
1,6-hexanediyl-bis(3,5-bis(1,1-dimethylethyl)-4-hydroxybenzene)propanoate) (CAS no. 35074-77-2; M 639 g/mol),
triethylenglycol-bis-(3-tert-butyl-4-hydroxy-5-methylphenyl) propionate (CAS no. 36443-68-2; M 587 g/mol),
a mixture of C13 to C15 linear and branched alkyl esters of 3-(3',5'-di-t-butyl-4'-hydroxyphenyl) propionic acid (CAS no. 171090-93-0; $M_w$ 485 g/mol), and
benzenepropanoic acid, 3,5-bis(1,1-dimethyl-ethyl)-4-hydroxy-C7-C9-branched and linear alkyl esters (CAS no. 125643-61-0; $M_w$ 399 g/mol), The most preferred phenolic antioxidant (C') is pentaerythrityl-tetrakis(3-(3,5-di-tert-butyl-4-hydroxyphenyl) propionate (CAS no. 6683-19-8; M 1178 g/mol) preferably having the formula (III)

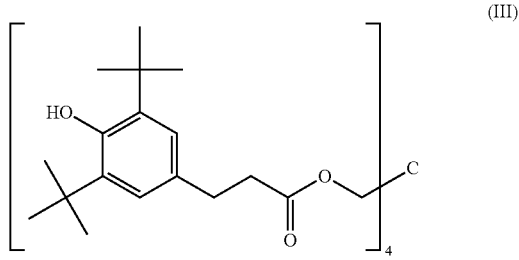

The present inventive polymer composition may comprise different organic antioxidants (C), like phenolic antioxidants (C'), as defined in the instant invention, however it is preferred that it comprises only one type of organic antioxidant (C), like phenolic antioxidant (C'), as defined herein.

The present polymer composition can additionally comprise in addition to the organic antioxidants (C) one or more phosphorous antioxidants (E). More preferably the polypropylene composition comprises only one type of phosphorous antioxidant (E). Preferred phosphorous antioxidants (E) are selected from the group consisting of
tris-(2,4-di-tert-butylphenyl) phosphite (CAS no. 31570-04-4; M 647 g/mol),
tetrakis-(2,4-di-tert-butylphenyl)-4,4'-biphenylen-di-phosphonite (CAS no. 38613-77-3; M 991 g/mol),
bis-(2,4-di-tert-butylphenyl)-pentaerythrityl-di-phosphite (CAS no. 26741-53-7; M 604 g/mol),
di-stearyl-pentaerythrityl-di-phosphite (CAS no. 3806-34-6; M 733 g/mol),
tris-nonylphenyl phosphite (CAS no. 26523-78-4; M 689 g/mol),
bis(2,6-di-tert-butyl-4-methylphenyl)pentaerythrityl-di-phosphite (CAS no. 80693-00-1; M 633 g/mol),
2,2'-methylenebis(4,6-di-tert-butylphenyl) octyl-phosphite (CAS no. 126050-54-2; M 583 g/mol),
1,1,3-tris(2-methyl-4-ditridecyl phosphite-5-tert-butylphenyl) butane (CAS no. 68958-97-4; M 1831 g/mol),
4,4'-butylidenebis(3-methyl-6-tert-butylphenyl-di-tridecyl) phosphite (CAS no. 13003-12-8; M 1240 g/mol),
bis-(2,4-dicumylphenyl)pentaerythritol diphosphite (CAS no. 154862-43-8; M 852 g/mol),
bis(2-methyl-4,6-bis(1,1-dimethylethyl) phenyl) phosphorous acid ethylester (CAS no. 145650-60-8; M 514 g/mol),
2,2',2"-nitrilo triethyl-tris(3,3',5,5'-tetra-tert-butyl-1,1'-biphenyl-2,2'-diyl)phosphite) (CAS no. 80410-33-9; M 1465 g/mol)
2,4,6-tris(tert-butyl)phenyl-2-butyl-2-ethyl-1,3-propandiol-phosphit (CAS no. 161717-32-4, M 450 g/mol),
2,2'-ethyliden-bis(4,6-di-tert-butylphenyl)fluorphosphonit (CAS no. 118337-09-0; M 487 g/mol),
6-(3-(3-tert-butyl-4-hydroxy-5-methylphenyl)propoxy)-2,4,8,10-tetra-tert-butyldibenz[d,f][1.3.2]dioxaphosphepin (CAS no. 203255-81-6; M 660 g/mol),
tetrakis-(2,4-di-tert-butyl-5-methylphenyl)-4,4'-biphenylen-di-phosphite (CAS no. 147192-62-9; M 1092 g/mol), and
1,3-bis-(diphenylphosphino)-2,2-dimethylpropane (CAS no. 80326-98-3; M 440.5 g/mol).

Especially suitable are organic phosphites, in particular those as defined in the above list, as phosphorous antioxidants (E).

The most preferred phosphorous antioxidant (E) is tris-(2,4-di-tert-butylphenyl) phosphite (CAS no. 31570-04-4; M 647 g/mol).

As stated above known polypropylene compositions comprising talc and organic antioxidants suffer from a rather quick degradation of the antioxidants. Such quick degradation—without be bonded on this theory—may be caused by the presence of talc and more importantly by the residues within in the talc. These residues may catalyse the degradation of the organic antioxidants. Thus, any means which may impede the catalytic activity of talc and/or its residues in view of the organic antioxidants reduces the degradation process and associated therewith minimises the headspace emission. It has been in particular discovered that carbonyl compounds (D), like carboxylic acid ($D^1$), carboxylic acid amide ($D^2$) and/or carboxylic acid ester ($D^3$), are in particular useful.

Preferably the carbonyl compounds (D), more preferably the preferably carbonyl compounds (D) selected from the group consisting of carboxylic acid ($D^1$), like aromatic carboxylic acid (benzoic acid), carboxylic acid amide ($D^2$), like fatty acid amide, and carboxylic acid ester ($D^3$), like fatty acid ester, have a pKa of at least 10.5. In particular the carbonyl compounds (D), more preferably the carbonyl compounds (D) selected from the group consisting of carboxylic acid ($D^1$), like aromatic carboxylic acid (benzoic acid), carboxylic acid amide ($D^2$), like fatty acid amide, and carboxylic acid ester ($D^3$), like fatty acid ester, have a pKa of 10.5 to 30, more preferably of 10.5 to 25.0.

Without be bonded on the theory the carbonyl compounds (D) as used in the present invention are able to bond on the surface of the talc and thus form a kind of sheeting surrounding the talc particles. The bonding may be a covalent bonding and/or ionic bonding. Another possible explanation for the positive technical effect achieved by the carbonyl compounds (D) as used herein is that they have sufficient acidity to protonate the oxygen rich surface of the talc (B) and thus reduce its catalytic activity. On the other hand the acidity is not too high which avoids undesired side-effects caused by high acidity levels. Accordingly the carbonyl compounds (D) as used herein impede contacting of the organic antioxidants (C) with the talc (B). Thus any degradation caused by talc (B) or its residues is therewith minimized or avoided.

As especially useful aromatic carboxylic acids ($D^1$), fatty acid amides ($D^2$) and fatty acid esters ($D^3$) have been recognized.

In case the new polymer composition comprises carboxylic acids ($D^1$) the benzoic acid is most preferred.

In case the new polymer composition comprises carboxylic acid amides ($D^2$) it is preferred that the carboxylic acid amides ($D^2$) have C10 to C25 carbon atoms, more preferably C16 to C24 carbon atoms. Even more preferred the carboxylic acid amides ($D^2$) are fatty acid amides having C10 to C25 atoms, like C16 to C24 carbon atoms. Particularly the carboxylic acid amides ($D^2$) are unsaturated. Thus unsaturated fatty acid amides, like unsaturated fatty acid amides having C10 to C25 atoms, like C16 to C24 carbon atoms, are especially appreciated. Accordingly the carboxylic acid amides ($D^2$) are preferably selected from the group consisting of 13-docosenamide (CAS no. 112-84-5), 9-octadecenamide (CAS no. 301-02-0), stearamide (CAS no. 124-26-5) and behenamide (CAS no. 3061-75-4). The most preferred carboxylic acid amide ($D^2$) is 13-docosenamide (CAS no. 112-84-5).

In case the new polymer composition comprises carboxylic acid ester ($D^3$), like fatty acid ester, it is appreciated that the carboxylic acid esters ($D^3$) are glycerol esters of the formula (IV)

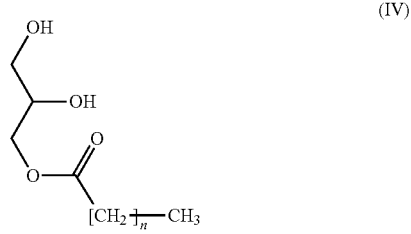

(IV)

wherein
n is 5 to 25, preferably 10 to 18.

Alternatively the carboxylic acid esters ($D^3$) can be glycerol esters of the formula (V-a) or (V-b)

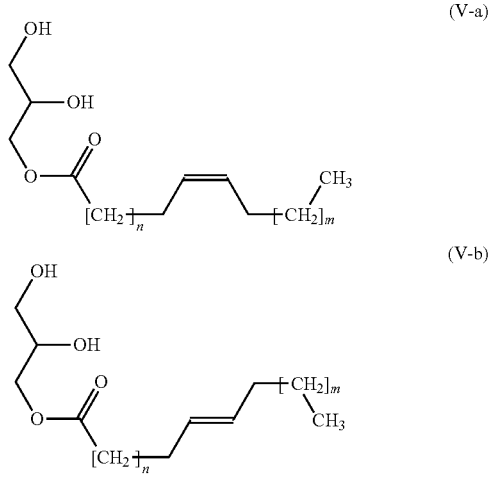

wherein
n and m are independently 1 to 9, preferably 4 to 8. More preferably n and m are identically.

Accordingly the carboxylic acid esters ($D^3$) are preferably selected from the group consisting of glycerol monostearate, glycerol monolaurate and 1,3-dihydroxypropan-2-yl(Z)-octadec-9-enoate.

The present inventive polymer composition may comprise different carbonyl compounds (D) as defined in the instant invention, however it is preferred that it comprises only one type of carbonyl compounds (D) as defined herein. Most preferably the inventive polymer composition comprises as carbonyl compound (D) only, namely a carboxylic acid ($D^1$) or a carboxylic acid amide ($D^2$) or a carboxylic acid ester ($D^3$) as defined in the instant invention.

Accordingly it is appreciated that polymer composition comprises
(a) at least 50 wt.-%, preferably at least 60 wt.-%, more preferably at least 70 wt.-% polypropylene (A), like heterophasic propylene copolymer (A'),
(b) 1,000 to 550,000 ppm, preferably 50,000 to 500,000 ppm, more preferably 100,000 to 400,000 ppm, yet more preferably 150,000 to 300,000 ppm, of talc (B),
(c) 100 to 5,000 ppm, preferably 500 to 5,000 ppm, more preferably 500 to 3,000 ppm, yet more preferably 200 to 1,000 ppm, of phenolic antioxidants (C), like pentaerythrityl-tetrakis(3-(3,5-di-tert-butyl-4-hydroxyphenyl) propionate (CAS no. 6683-19-8; M 1178 g/mol),
(d) 100 to 8,000 ppm, preferably 500 to 5,000 ppm, more preferably 500 to 3,000 ppm, yet more preferably 800 to 3,000 ppm, of carbonyl compounds (D) selected from the group consisting of carboxylic acid ($D^1$), like aromatic carboxylic acid (benzoic acid), carboxylic acid amide ($D^2$), like fatty acid amide, and carboxylic acid ester ($D^3$), like fatty acid ester (e.g. glycerol ester according to formulas (IV), (V-a) and (V-b)), as defined in the instant invention, and
(e) optionally 100 to 5,000 ppm, preferably 500 to 3,000 ppm, more preferably 500 to 1,500 ppm, yet more preferably 1,000 to 1,500 ppm, of phosphorous antioxidants (E), like tris-(2,4-di-tert-butylphenyl) phosphite (CAS no. 31570-04-4; M 647 g/mol),
based on the polypropylene composition.

Of course the present invention may comprise further additives like calcium stearate and/or pigments, for instance in the form of a master batch.

However it is especially appreciated as stated above that the polymer composition is free of hindered amine light stabilizers (F).

According to the present invention hindered amine light stabilizers (F) are in particular 2,6-alkyl-piperidine derivatives, like 2,2,6,6-tetramethyl-piperidine derivatives. Thus it is appreciated that the present polymer composition is free of such piperidine derivatives.

The polymer composition according to this invention is obtained by extruding the polymer and thereby adding the additives as mentioned in the instant invention. Preferably a twin-screw extruder is used, like the twin-screw extruder ZSK40. The polymer composition pelletized with the twin-screw extruder ZSK 40 is used in the headspace emission test according to VDA 277.

The present invention is additionally directed to the use of the inventive polymer composition as a covering element for vehicles and/or back sheets of blister packaging, in particular to reduce the headspace emission according to VDA 277.

Furthermore the present invention is directed to articles, preferably automotive articles, more preferably automotive interior articles, like dashboards, door claddings, armrests or other interior trims, comprising the polymer composition as defined herein. The invention is further directed to blister packaging, in particular to the back sheets of blister packaging, comprising the polymer composition of the instant invention.

Finally the present invention is directed to the use of carbonyl compounds (D) selected from the group consisting of carboxylic acid ($D^1$), like aromatic carboxylic acid (benzoic acid), carboxylic acid amide ($D^2$), like fatty acid amide, and carboxylic acid ester ($D^3$), like fatty acid ester (e.g. glycerol ester according to formulas (IV), (V-a) and (V-b)), as defined in the instant invention to reduce the headspace emission according to VDA 277, in particular to reduce the emission of 2-methyl-1-propene according to VDA 277, of a polymer composition, preferably of a polymer composition comprising talc, more preferably of a polymer composition comprising talc and organic antioxidants. Thus the present invention is in particular directed to the use of carbonyl compounds (D) selected from the group consisting of carboxylic acid ($D^1$), like aromatic carboxylic acid (benzoic acid), carboxylic acid amide ($D^2$), like fatty acid amide, and carboxylic acid ester ($D^3$), like fatty acid ester (e.g. glycerol ester according to formulas (IV), (V-a) and (V-b)), as defined in the instant invention to reduce the headspace emission according to VDA 277, in particular to reduce the emission of 2-methyl-1-propene according to VDA 277, of a polymer composition comprising talc (B) and antioxidants (C) as defined in the instant invention but no carbonyl compounds (D) selected from the group consisting of carboxylic acid ($D^1$), like aromatic carboxylic acid (benzoic acid), carboxylic acid amide ($D^2$), like fatty acid amide, and carboxylic acid ester ($D^3$), like fatty acid ester (e.g. glycerol ester according to formulas (IV), (V-a) and (V-b)). Accordingly the use of the carbonyl compounds (D) selected from the group consisting of carboxylic acid ($D^1$), like aromatic carboxylic acid (benzoic acid), carboxylic acid amide ($D^2$), like fatty acid amide, and carboxylic acid ester ($D^3$), like fatty acid ester (e.g. glycerol ester according to formulas (IV), (V-a) and (V-b)), in the polymer composition as defined in the instant invention shall reduce the headspace emission according VDA 277, in particular shall reduce the emission of 2-methyl-1-propene according to VDA 277, of at least 30%, preferably of at least 40%, yet more preferably of at least 45%, wherein the percentage is defined as follows:

$$\% = \left(1 - \left[\frac{(\mu gC/g) \text{ of a polymer composition comprising an organic metal deactivator}}{(\mu gC/g) \text{ of the same polymer composition but without organic metal deactivator}}\right]\right) * 100.$$

Considering the above information, the present invention is in particular directed to
[Paragraph 1] Polymer composition comprising
(a) polypropylene (A)
(b) talc (B)
(c) organic antioxidants (C),
(d) carbonyl compounds (D) selected from the group consisting of carboxylic acid ($D^1$), carboxylic acid amide ($D^2$) and carboxylic acid ester ($D^3$)
with the proviso that the carbonyl compounds (D) have a pKa measured in DMSO of at least 10.5, and
(e) optionally phosphorous antioxidants (E).
[Paragraph 2] Polymer composition according to [Paragraph 1], wherein the carboxylic acid ($D^1$) is an aromatic carboxylic acid and/or the carboxylic acid amide ($D^2$) is a fatty acid amide ($D^2$) and/or the carboxylic acid ester ($D^3$) is a fatty acid ester ($D^3$).
[Paragraph 3] Polymer composition comprising
(a) polypropylene (A)
(b) talc (B)
(c) organic antioxidants (C),
(d) carbonyl compounds (D) selected from the group consisting of aromatic carboxylic acid ($D^1$) having a pKa measured in DMSO of at least 10.5, fatty acid amide ($D^2$) and fatty acid ester ($D^3$), and
(e) optionally phosphorous antioxidants (E).
[Paragraph 4] Polymer composition according to anyone of the preceding [Paragraphs 1 to 3], wherein the composition comprises (a) 1,000 to 550,000 ppm of talc (B),
(b) 100 to 5,000 ppm of phenolic antioxidants (C),
(c) 100 to 8,000 ppm carbonyl compounds (D), and
(d) optionally 100 to 5,000 ppm of phosphorous antioxidants (E), based on the composition.
[Paragraph 5] Polymer composition according to anyone of the preceding [Paragraphs 1 to 4], wherein the polymer composition does not comprise hindered amine light stabilizers (F).
[Paragraph 6] Polymer composition according to anyone of the preceding [Paragraphs 1 to 5], wherein the polymer composition comprises at least 50 wt.-% polypropylene.
[Paragraph 7] Polymer composition according to anyone of the preceding [Paragraphs 1 to 6], wherein the polypropylene (A) is a heterophasic propylene copolymer (A') comprising a polypropylene matrix ($A^1$) and an amorphous elastomer ($A^2$).
[Paragraph 8] Polymer composition according to anyone of the preceding [Paragraphs 1 to 7], wherein the talc (B) comprises iron residues, preferably iron oxide (FeO) and/or iron silicate.
[Paragraph 9] Polymer composition according anyone of the preceding [Paragraphs 1 to 8], wherein the organic antioxidants (C) are phenolic antioxidants (C'), preferably sterically hindered phenolic antioxidants (C').
[Paragraph 10] Polymer composition according anyone of the preceding [Paragraphs 1 to 9], wherein the organic antioxidants (C) are phenolic antioxidants (C') comprising the residue of formula (I)

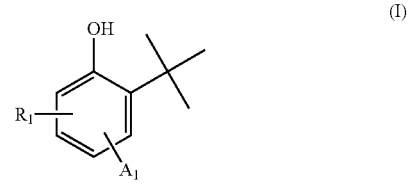

wherein
$R_1$ being located at the ortho- or meta-position to the hydroxyl-group and $R_1$ is $(CH_3)_3C-$, $CH_3-$ or H, preferably $(CH_3)_3C-$, and
$A_1$ constitutes the remaining part of the phenolic antioxidant (C').
[Paragraph 11] Polymer composition according to any one of the preceding [Paragraphs 1 to 10], wherein the carbonyl compounds (D) selected from the group consisting of aromatic carboxylic acid ($D^1$), fatty acid amide ($D^2$) and fatty acid ester ($D^3$) have a pKa measured in DMSO of not more than 30, preferably in the range of 10.5 to 30.
[Paragraph 12] Polymer composition according to any one of the preceding [Paragraphs 1 to 11], wherein the carbonyl compound (D) is benzoic acid.
[Paragraph 13] Polymer composition according to any one of the preceding [Paragraphs 1 to 11], wherein the fatty acid amide ($D^2$) is an unsaturated fatty acid amide, preferably an unsaturated fatty acid amide having C10 to C25 carbon atoms.

[Paragraph 14] Polymer composition according to any one of the preceding [Paragraphs 1 to 11], wherein the fatty acid ester ($D^3$) is a glycerol ester of the formula (IV)

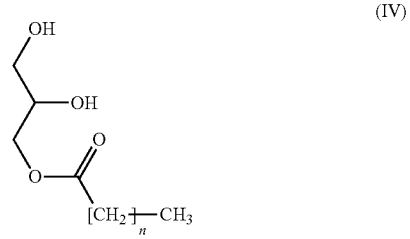

(IV)

wherein
n is 5 to 25, preferably 10 to 18.

[Paragraph 15] Polymer composition according to any one of the preceding [Paragraphs 1 to 11], wherein the fatty acid ester ($D^3$) is a glycerol ester of the formula (V-a) or (V-b)

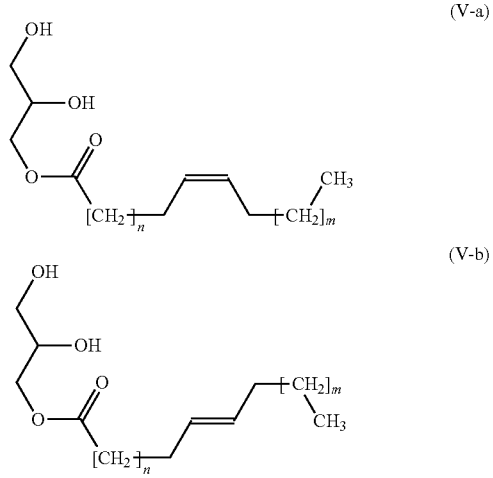

(V-a)

(V-b)

wherein
n and m are independently 1 to 9, preferably 4 to 8.

[Paragraph 16] Polymer composition according to any one of the preceding [Paragraphs 1 to 15], wherein the carbonyl compounds (D) are selected from the group consisting of benzoic acid, glycerol monostearate (CAS-no 97593-29-83) and 13-docosenamide (CAS-no 112-84-5).

[Paragraph 17] Use of the carbonyl compounds (D) as defined in anyone of the preceding [Paragraphs 1 to 16] to reduce the headspace emission according to VDA 277, preferably the headspace emission of 2-methyl-propene according to VDA 277, of a polymer.

[Paragraph 18] Use according to [Paragraph 17], wherein the degradation of the organic antioxidants (C) as defined in anyone of the preceding claims [Paragraphs 1 to 16] is reduced.

[Paragraph 19] Use according to [Paragraph 17 or 18], wherein the carbonyl compounds (D) are part of the polymer.

[Paragraph 20] Use according to any one of the preceding [Paragraphs 17 to 19], wherein the polymer comprises additionally talc (B), preferably talc as defined in any one of the preceding claims 1 to 16.

[Paragraph 21] Use according to any one of the [Paragraphs 17 to 20], wherein the carbonyl compounds (D) and the organic antioxidants (C) are part of a polymer composition as defined in anyone of the preceding claims 1 to 16.

[Paragraph 22] Use according to any one of the [Paragraphs 17 to 21], wherein the carbonyl compounds (D) reduce the headspace emission according to VDA 277, preferably the headspace emission of 2-methyl-propene according to VDA 277, of at least 30% of a polymer composition, preferably of a polymer composition as defined in anyone of the claims 1 to 16, compared to the same polymer composition but without carbonyl compounds (D) as defined in anyone of the claims 1 to 16.

[Paragraph 23] Article, preferably an automotive article or a back sheet of blister packaging, comprising the polymer composition according to anyone of the preceding [Paragraphs 1 to 16].

The present invention is further described by way of examples.

EXAMPLES

1. The following definitions of terms and determination of methods apply for the above general description of the invention as well as to the below examples unless otherwise defined.

Molecular Weights, Molecular Weight Distribution (Mn, Mw, MWD)

Mw/Mn/MWD are measured by Gel Permeation Chromatography (GPC) according to the following method:

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 μL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

$MFR_2$ (230° C.) is measured according to ISO 1133 (230° C., 2.16 kg load).

$MFR_2$ (190° C.) is measured according to ISO 1133 (190° C., 2.16 kg load).

Ethylene content is measured with Fourier transform infrared spectroscopy (FTIR) calibrated with $^{13}$C-NMR. When measuring the ethylene content in polypropylene, a thin film of the sample (thickness about 250 μm was prepared by hot-pressing. The area of absorption peaks 720 and 733 cm$^{-1}$ was measured with Perkin Elmer FTIR 1600 spectrometer. The method was calibrated by ethylene content data measured by $^{13}$C-NMR.

Particle size is measured according to ISO 13320-1:1999

The xylene solubles (XS, wt.-%): Content of Xylene solubles (XS) is determined at 23° C. according ISO 6427.

VDA 277 (Available for Instance from "Dokumentation Kraftfahrwesen (DKF); Ulrichstraβe 14, 74321 Bietigheim Bissingen)

The content of volatiles is determined according to VDA 277:1995 using a gas chromatography (GC) device with a WCOT-capillary column (wax type) of 0.25 mm inner diameter and 30 m length. The GC settings were as follows: 3 minutes isothermal at 50° C., heat up to 200° C. at 12 K/min, 4 minutes isothermal at 200° C., injection-temperature: 200° C., detection-temperature: 250° C., carrier helium, flow-mode split 1:20 and average carrier-speed 22-27 cm/s.

In addition to the FID detector for the summary volatile evaluation a MS detector is used for the evaluation of the single volatile components. A specific Quadropol MS was used with the following settings: 280° C. transfer-line temperature, scan method with scanning rate of 15-600 amu, relative EMV mode, mass calibration with standard spectra autotune, MS source temperature of 230° C. and MS Quad temperature of 150° C.

2. Preparation of Examples

TABLE 1

Properties of the examples

| | | CE1 | E1 | E2 | E3 | E4 | CE2 | CE3 |
|---|---|---|---|---|---|---|---|---|
| MFR | [g/10 min] | 10.5 | 12.4 | 11.6 | 12.2 | 10.2 | 9.9 | 11.2 |
| HECO | [wt %] | 79.678 | 79.078 | 79.378 | 78.978 | 79.478 | 77.178 | 79.378 |
| PA | [wt %] | 0.190 | 0.190 | 0.190 | 0.190 | 0.190 | 0.190 | 0.190 |
| OA | [wt %] | 0.100 | 0.100 | 0.100 | 0.100 | 0.100 | 0.100 | 0.100 |
| Calcium stearate | [wt %] | 0.032 | 0.032 | 0.032 | 0.032 | 0.032 | 0.032 | 0.032 |
| talc | [wt %] | 20.000 | 20.000 | 20.000 | 20.000 | 20.000 | 20.000 | 20.000 |
| benzoic acid | [wt %] | | 0.600 | | | | | |
| GMS A | [wt %] | | | 0.300 | | | | |
| GMS B | [wt %] | | | | 0.700 | | | |
| FAA | [wt %] | | | | | 0.200 | | |
| Mg(OH)$_2$ | [wt %] | | | | | | 2.500 | |
| anthracene | [wt %] | | | | | | | 0.300 |
| total content volatile [VDA 277] | [µgC/g] | 155 | 92 | 58 | 49 | 42 | 155 | 190 |
| 2-methyl-1-propene [VDA 277] | [µgC/g] | 110 | 20 | 23 | 12 | 1.68 | 111 | 142 |

HECO: heterophasic polypropylene copolymer, namely the commercial product BE170MO of Borealis (MFR$_2$ of 13 g/10 min; xylene soluble content of 15 wt.-%, ethylene content of 7 wt.-%
PA: phosphorous antioxidant, namely tris (2,4-di-t-butylphenyl) phosphite (CAS no 31570-04-4) [IRGAFOS 168]
PO: organic antioxidant, namely pentaerythrityl-tetrakis(3-(3',5'-di-tert. butyl-4-hydroxyphenyl)-propionate (CAS no 6683-19-8) [IRGANOX 1010]
GMS A: is a GMS 90; i.e. a composition which contains 90% glycerol monostearate [Dimodan HA FF]
GMS B: is a GMS 40; i.e. a composition which contains 40% glycerol monostearate [HO 40 NL]
FAA: 13-docosenamide (CAS no 112-84-5) [Crodamide OR]

We claim:

1. A method of reducing a headspace emission in a polymer comprising using an effective amount of carbonyl compounds (D) selected from the group consisting of aromatic carboxylic acid (D$^1$) having a pKa measured in DMSO of at least 10.5, fatty acid amide (D$^2$) and fatty acid ester (D$^3$) used in an effective amount in a polymer for reducing the headspace emission of 2-methyl-propene according to VDA 277 of at least 30% by weight of the polymer composition compared to the same polymer composition but without carbonyl compounds (D).

2. The method according to claim 1, wherein the carbonyl compounds (D) are part of a polymer composition, wherein said composition comprises in addition to the carbonyl compounds (D) a polypropylene (A), talc (B), organic antioxidants (C), and optionally phosphorous antioxidants (E).

3. The method according to claim 2, wherein the composition comprises
    (a) 1,000 to 550,000 ppm of talc (B),
    (b) 100 to 5,000 ppm of phenolic antioxidants (C),
    (c) 100 to 8,000 ppm carbonyl compounds (D), and
    (d) optionally 100 to 5,000 ppm of phosphorous antioxidants (E), based on the composition.

4. The method according to claim 2, wherein the polymer composition does not comprise hindered amine light stabilizers (F).

5. The method according to claim 2, wherein the polymer composition comprises at least 50 wt.-% polypropylene.

6. The method according to claim 2, wherein the polypropylene (A) is a heterophasic propylene copolymer (A') comprising a polypropylene matrix (A$^1$) and an amorphous elastomer (A$^2$).

7. The method according to claim 2, wherein the talc (B) comprises iron residues.

8. The method according to claim 2, wherein the organic antioxidants (C) are phenolic antioxidants (C').

9. The method according to claim 2, wherein the organic antioxidants (C) are phenolic antioxidants (C') comprising the residue of formula (I)

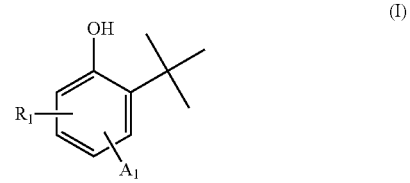

wherein
R$_1$ being located at the ortho- or meta-position to the hydroxyl-group and R$_1$ is (CH$_3$)$_3$C—, CH$_3$— or H, and
A$_1$ constitutes the remaining part of the phenolic antioxidant (C').

10. The method according to claim 2, wherein the carbonyl compounds (D) have a pKa measured in DMSO of not more than 30.

11. The method according to claim 2, wherein the carbonyl compound (D) is benzoic acid.

12. The method according to claim 1, wherein the fatty acid amide ($D^2$) is an unsaturated fatty acid amide.

13. The method according to claim 1, wherein the fatty acid ester ($D^3$) is a glycerol ester of the formula (IV)

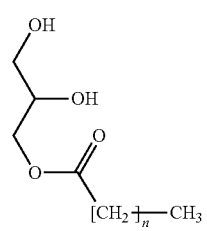

(IV)

wherein
n is 5 to 25.

14. The method according to claim 13, wherein the fatty acid ester ($D^3$) is a glycerol ester of the formula (V-a) or (V-b)

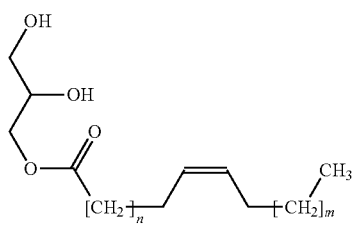

(V-a)

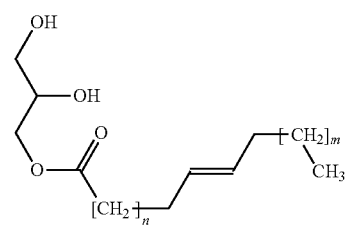

(V-b)

wherein
n and m are independently 1 to 9.

15. The method according to claim 1, wherein the carbonyl compounds (D) are selected from the group consisting of benzoic acid, glycerol monostearate and 13-docosenamide.

16. The method according to claim 2, wherein the degradation of the organic antioxidants (C) is reduced.

17. The method according to claim 2, wherein the talc (B) comprises iron oxide (FeO) and/or iron silicate.

18. The method according to claim 2, wherein the organic antioxidants (C) are sterically hindered phenolic antioxidants (C').

19. The method according to claim 2, wherein the organic antioxidants (C) are phenolic antioxidants (C') comprising the residue of formula (I)

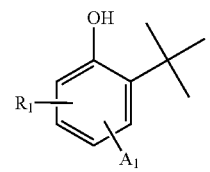

(I)

wherein
$R_1$ being located at the ortho- or meta-position to the hydroxyl-group and $R_1$ is $(CH_3)_3C$—, and
$A_1$ constitutes the remaining part of the phenolic antioxidant (C').

20. The method according to claim 2, wherein the carbonyl compounds (D) have a pKa measured in DMSO in the range of 10.5 to 30.

21. The method according to claim 1, wherein the fatty acid amide ($D^2$) is an unsaturated fatty acid amide having C10 to C25 carbon atoms.

22. The method according to claim 1, wherein the fatty acid ester ($D^3$) is a glycerol ester of the formula (IV)

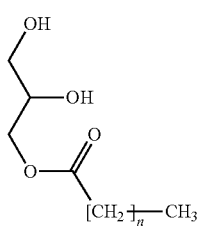

(IV)

wherein
n is 10 to 18.

23. The method according to claim 13, wherein the fatty acid ester ($D^3$) is a glycerol ester of the formula (V-a) or (V-b)

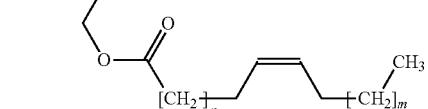

(V-a)

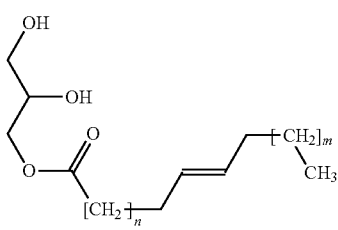

(V-b)

wherein
n and m are independently 4 to 8.

24. The method according to claim 2, wherein the carbonyl compounds (D) reduce the headspace emission of 2-methyl-propene according to VDA 277 of at least 45% by weight of the polymer composition compared to the same polymer composition but without carbonyl compounds (D).

25. A polymer composition comprising,
a polypropylene (A);
talc (B), said talc (B) comprising iron oxide (FeO) and/or iron silicate;
organic antioxidants (C);
carbonyl compounds (D) to reduce the headspace emission of 2-methyl-propene according to VDA 277, of said polymer composition;
wherein the carbonyl compounds (D) are selected from the group consisting of aromatic carboxylic acid ($D^1$) having a pKa measured in DMSO of at least 10.5, fatty acid amide ($D^2$) and fatty acid ester ($D^3$) used in an effective amount for reducing the headspace emission of 2-methyl-propene according to VDA 277 of at least 30% by weight of the polymer composition compared to the same polymer composition but without carbonyl compounds (D) to about 23 μgC/g or less; and
optionally phosphorous antioxidants (E);

wherein the fatty acid ester ($D^3$) is a glycerol ester of the formula (V-a) or (V-b)

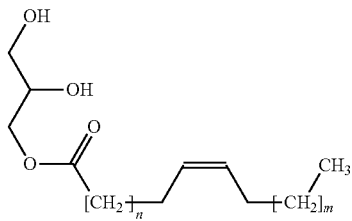

(V-a)

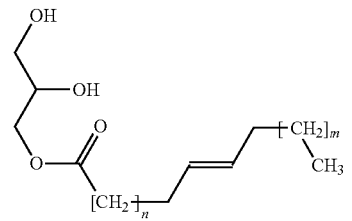

(V-b)

wherein
n and m are independently 1 to 9.

26. The polymer composition according to claim 25, wherein the composition comprises
(a) 1,000 to 550,000 ppm of talc (B),
(b) 100 to 5,000 ppm of phenolic antioxidants (C),
(c) 100 to 8,000 ppm carbonyl compounds (D), and
(d) optionally 100 to 5,000 ppm of phosphorous antioxidants (E), based on the composition.

27. The polymer composition according to claim 25, wherein the polymer composition does not comprise hindered amine light stabilizers (F).

* * * * *